Sept. 23, 1969 H. S. JONES 3,468,597

TELESCOPE IMAGE SWITCHING SYSTEMS

Original Filed April 21, 1965 3 Sheets-Sheet 1

INVENTOR

Harry S. Jones

Sept. 23, 1969 H. S. JONES 3,468,597

TELESCOPE IMAGE SWITCHING SYSTEMS

Original Filed April 21, 1965 3 Sheets-Sheet 2

INVENTOR

Harry S. Jones

INVENTOR

Harry S. Jones

United States Patent Office 3,468,597
Patented Sept. 23, 1969

3,468,597
TELESCOPE IMAGE SWITCHING SYSTEMS
Harry S. Jones, 933 Hudson St.,
Hoboken, N.J. 07030
Continuation of application Ser. No. 449,701, Apr. 21, 1965. This application Sept. 3, 1968, Ser. No. 757,167
Int. Cl. G02b *23/14*
U.S. Cl. 350—28 8 Claims

ABSTRACT OF THE DISCLOSURE

Improvement in a telescopic system having a single eyepiece and two objectives, of which one objective is called a finder objective and is used for locating the object to be viewed in greater detail through a main objective, wherein both the main and the finder objectives are independently focusable and are each equipped with independent reflective systems connecting each to the single eyepiece without relation to the other.

This application is a continuation of Ser. No. 449,701, filed Apr. 21, 1965.

My invention is a telescope image-switching system that is applicable to all types of telescopes having a dual optical system consisting of a main imaging system and an auxiliary imaging system generally known as the "finder" system.

In my invention either the main or the auxiliary system may be "switched" to a conveniently-located common eyepiece having its axis perpendicular to the axes of the two systems and the eyepiece image is erect in both systems. This feature greatly facilitates the effective use of the telescope since most telescopes now manufactured produce non-erect eyepiece images in both systems and, often a different type of non-erect image in each system.

Another form of my invention results in an erect image in each system at the common eyepiece when the main imaging system produces an erect image rather than the usual inverted image.

Another feature of my invention is that an achromatic equalizer lens may be added or switched into the system whe desired in order to permit the main system focus to be equalized with that of a camera so that the main system may be used as a precision focusing and image-centering means for the camera. To facilitate this feature the finder focus as well as the main system focus is accomplished by movement of the respective system objectives. To facilitate non-wobbling precision axial movement of the main system objective the largest possible telescoping tube diameters are utilized.

In addition to the above conveniences and advantages another achromatic lens may be added to or switched into the system when desired in order to permit a wider range of magnifications in combination with either an eyepiece of fixed-focal length or a "Zoom" type variable-focal length eyepiece.

An intrinsic advantage of this dual erect-imaging system is that the Amici type. prism is not used when the main system produces the usual inverted image. The use of this optical component, which is difficult and expensive to manufacture to acceptable quality, is avoided by utilization of a penta prism.

Another intrinsic advantage is that which results from the common eyepiece location which permits the observer's eye always to be in the best average position for either astronomical or terrestrial viewing, with or without attachment of a camera. The images furnished by each system via the common eyepiece are erect to an observer situated behind the telescope and looking in a generally downward direction while facing toward the object being viewed.

A further intrinsic advantage is the location of the finder objective in a position conveniently close to the common eyepiece so that the finder system focus may be easily adjusted at its objective, thereby leaving the common eyepiece focal adjustment free for precise equalization of the camera and main visual system foci when desired.

The various features and advantages of my invention will be more clearly understood from the drawings and description which follow:

Figures 1, 2, 2A:
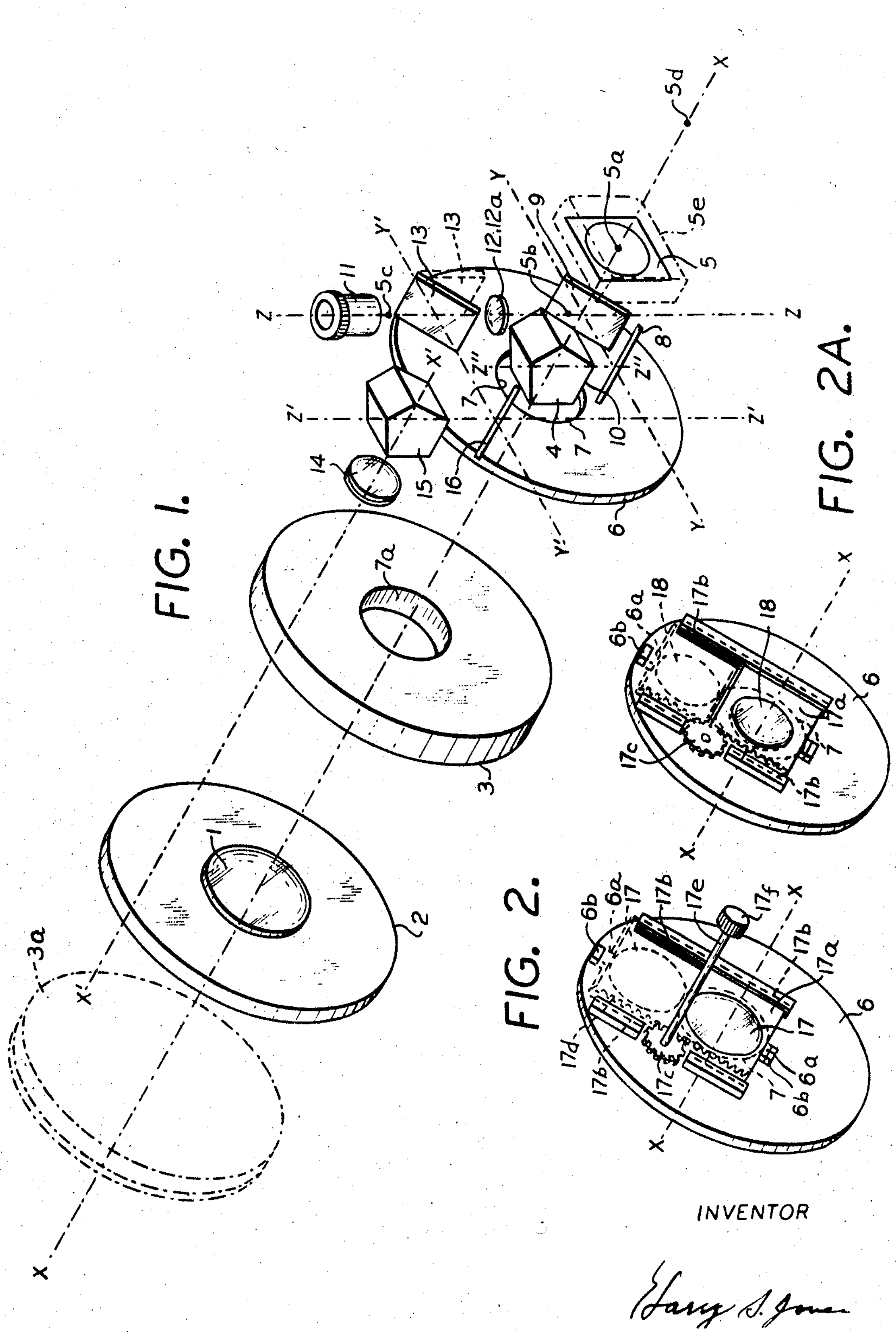
FIGURE 1 is a perspective view showing certain optical components used in an optical switching system.
FIGURE 2 is a fragmentary, perspective view showing means of support and control of an auxiliary lens.
FIGURE 2A is a fragmentary, perspective view showing means of support and control of an auxiliary lens.

FIGURE 1 shows some of the optical components used in my invention in combination with a conventional Cassegrainian type main imaging system which is typical of those reflective systems which, when used alone, produce an inverted image. Closely-equivalent to the conventional Cassegrainian system are the Schmidt, Maksutov and Bouwers type Cassegrainian systems. These systems, or an achromatic type refractive objective lens *3a* shown by dotted lines, may also be used with those systems in my invention that are illustrated using a conventional Cassegrainian type main imaging system.

In FIGURE 1 the small convex Cassegrainian secondary mirror 1 is supported upon a plane-parallel window 2 in front of the large concave primary mirror 3 along their common optical axis X—X. A Schmidt type corrector may also serve as window 2 when desired. Components 1 and 2 are mounted in a fixed position relative to a support base 6 which is perpendicular to axis X—X. Mirror 3 is moveable along axis X—X and mirror 3 and all other moveable components used in this invention are adjustably-mounted relative to support base 6, as hereinafter described.

When moveable penta prism 4 is removed from the operative position shown in FIGURE 1, in which it bends rays passing along axis X—X through 90° to axis Z″—Z″, the basic Cassegrainian system's inverted image focal plane 5 is transferred to a position perpendicular to axis X—X at point *5a* on axis X—X. When mirror 13 is in its inactive or storage position, as shown by dotted lines, and when penta prism 4 is in the functioning position shown in FIGURE 1 relative to support base 6, in which base contains a central aperture 7 which is concentric with axis X—X, focal point *5a*, corresponding to a distant point object located on axis X—X, will be transferred to a point *5b* which may fall either along optical axis Z″—Z″, Y—Y or along axis Z—Z as shown. This transfer of the image from point *5a* to point *5b* is accomplished by one or more of the components including penta prism 4, fixed plane mirror 8 and fixed plane mirror 9, depending upon whether point *5b* falls along axis Z″—Z″, Y—Y or axis Z—Z. Mirrors 8 and 9 have their plane surfaces parallel with axis X—X and at 45° to the bottom surface 10 of penta prism 4 and at 90° to each other. It will be clear that a single Porro prism might be substituted for mirrors 8 and 9, the two small plane surfaces of the Porro prism being equivalent to mirrors 8 and 9. Penta prism 4 will transfer the optical axis from X—X to Z″—Z″ and mirror 8 will transfer the optical axis from Z″—Z″ to Y—Y and mirror 9 will transfer the optical axis from Y—Y to Z—Z. Optical axes X—X and X′—X′ are parallel, axes Y—Y and Y′—Y′ are parallel and axis Z—Z, Z′—Z′ and Z″—Z″ are parallel. The letters X, Y and Z designate axes that are mutually perpendicular to each other.

The optical path length from support base hole 7 through penta prism 4, mirrors 8 and 9, and between mirror 9 and the field plane position *5c* of eyepiece 11 will usually be substatnially longer than the optical path lentgh from support base hole 7 to camera image point *5a*. Depending upon various design factors, including the position chosen for the camera focal plane 5, the focal point *5b* may, in practice, fall at any point on axis Y—Y between mirrors 8 and 9 or at any point on axis Z—Z between mirror 9 and field plane *5c* of eyepiece 11 which is coaxial with axis Z—Z. Therefore, in the system shown in FIGURE 1, it would be necessary to vary the main system focus by axial movement of mirror 3 relative to support base 6 in order to obtain a sharp erect image at point *5c* if a sharp image had first existed at camera image point *5a*. Means for providing sharp focus at points *5a* and *5c* with an erect image at point *5c*, wtihout changing the main system focus by movement of mirror 3, are described in a subsequent portion of this description.

When mirror 13 is removed from its storage position, as shown by dotted lines, and is brought into use in the position shown by the solid lines so that its plane surface is parallel with axis X—X and so that it is at an angle of 45° to axis Y′—Y′ eyepiece 11 will then be provided with an erect image at field point *5c* of the distant object produced by the auxiliary or "finder" objective 14. This auxiliary image will appear "erect" to an observer facing the distant object along axis X—X when looking "down" into eyepiece 11. This auxiliary image of the distant object will be formed at point *5c* by objective 14 after transfer of axis X′—X′ of objective 14 to axis Z′—Z′ by fixed penta prism 15, fixed plane mirror 16 and moveable mirror 13. When desired, mirror 16 may be replaced by an equivalent 90° reflection prism. Mirror 16 is also located with its reflective plane parallel with axis X—X and axis X′—X′ and at 45° to axis Y—Y or Y′—Y′. Mirrors 13 and 16 are located along axes Z—Z and Z′—Z′, respectively, so that axis Y′—Y′ passes through their centers and with their reflective surfaces facing each other and facing penta prism 15 and eyepiece 11. Penta prism 15 is located so that it bends rays passing along axis X′—X′ through 90° to axis Z′—Z′.

When penta prism 4 is removed from the position shown in FIGURE 1 a camera housing *5e* containing film or other photo-sensitive material or a photo-electric surface may be placed so that the film or photo-electric surface coincides with the main system image plane 5.

When the image of a distant object is focused upon a light-sensitive plane 5 at point *5a* this image will be transferred to a point *5b* when penta prism 4 is placed in the operative position shown in FIGURE 1 and the optical path from base 6 to point *5c* usually will be considerably longer than that from base 6 to point *5a* or to *5b*. This longer path to point *5c* is due to the increase in optical path caused by penta prism 4 and mirrors 8 and 9. If mirror 3 is moved along axis X—X in a direction toward mirror 1 and away from base 6 focal point *5b* may be moved to coincide with point *5c* where it will appear erect and sharp to an observer using eyepiece 11. In the corresponding case wherein an achromatic objective *3a*, shown by dotted lines in FIGURE 1, is substituted for mirrors 1 and 3 objective *3a* would, of course, have to be moved along axis X—X toward base 6 to obtain a sharp and erect image at point *5c* in the field of eyepiece 11. However, with penta prism 4 in its storage position, after this focal adjustment of the position of main system objective 3 or *3a*, the image of a distant object will no longer fall at point *5a* but at a point *5d* on axis X—X which usually will be substantially further from base 6 than point *5a*. To correct this condition a positive achromat 17 may be moved from an inactive or storage position, as shown by dotted lines in FIGURE 2, to a position between base 6 and the position of penta prism 4 when used, and in which position its optical axis is coincident with axis X—X, as shown by solid lines in FIGURE 2. If achromat 17 has the correct focal length the camera focus at *5a* will be sharp with lens 17 in place and with penta prism 4 in storage. The erect image available to an observer using eyepiece 11 will also be sharp when lens 17 is returned to its storage position and penta prism 4 is returned to its operating position as shown in FIGURE 1. Mirror 13 will, of course, be in its storage position, as shown by dotted lines in FIGURES 1 and 3.

In FIGURES 2 and 2A lens 17 or 18 may be supported by a plate *17a* held within grooved ways *17b*. Plate *17a* may be moved by means of pinion *17c* engaging teeth *17d* provided on one side of plate *17a*. The position of lens 17 may be switched by means of a knob *17f* attached to a shaft *17e* fastened to pinion *17c* and passing through a bearing hole in base 6. Positive stop action at each extreme of switching motion may be provided by means of small permanent magnets *6a* attached to opposite sides of plate *17a*. Magnets *6a* are attracted to stop bumpers *6b* attached to base plate 6 at each extreme of travel of plate *17a*.

Figure 5:
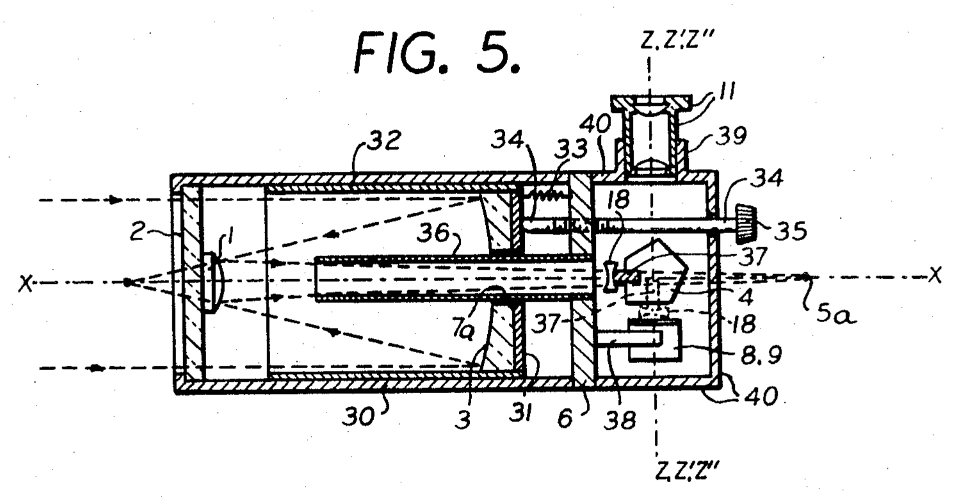
FIGURE 5 is a fragmentary longitudinal sectional view showing some components as viewed perpendicular to the main optical axis of a typical main objective system having an inverted image.

If mirror 3 is not moved for focal adjustment of the main optical system, as described in the previous paragraph, and the main system focal point falls at *5a* a negative achromat 18 may be moved from an inactive or storage position, as shown by the dotted lines in FIGURE 2A, to a position between base 6 and the position of penta prism 4 when used and in which position its optical axis is coincident with axis X—X, as shown by solid lines in FIGURE 2A. If achromat 18 has the correct focal length the erect image available to an observer using eyepiece 11 will be sharp when penta prism 4 is in its operating position, as shown in FIGURE 1. Mirror 13 will, of course, be in its storage position, as shown by dotted lines in FIGURES 1 and 3. When lens 18 is moved to its storage position and penta prism 4 is removed from its active position the camera focus at *5a* will be sharp as before. Since the negative achromat 18 is needed only when penta prism 4 is needed lens 18 may, if desired, be directly fastened to penta prism 4 close to either transmission face, as shown in FIGURE 5.

Figures 3, 3A, 4, 4A, 7:
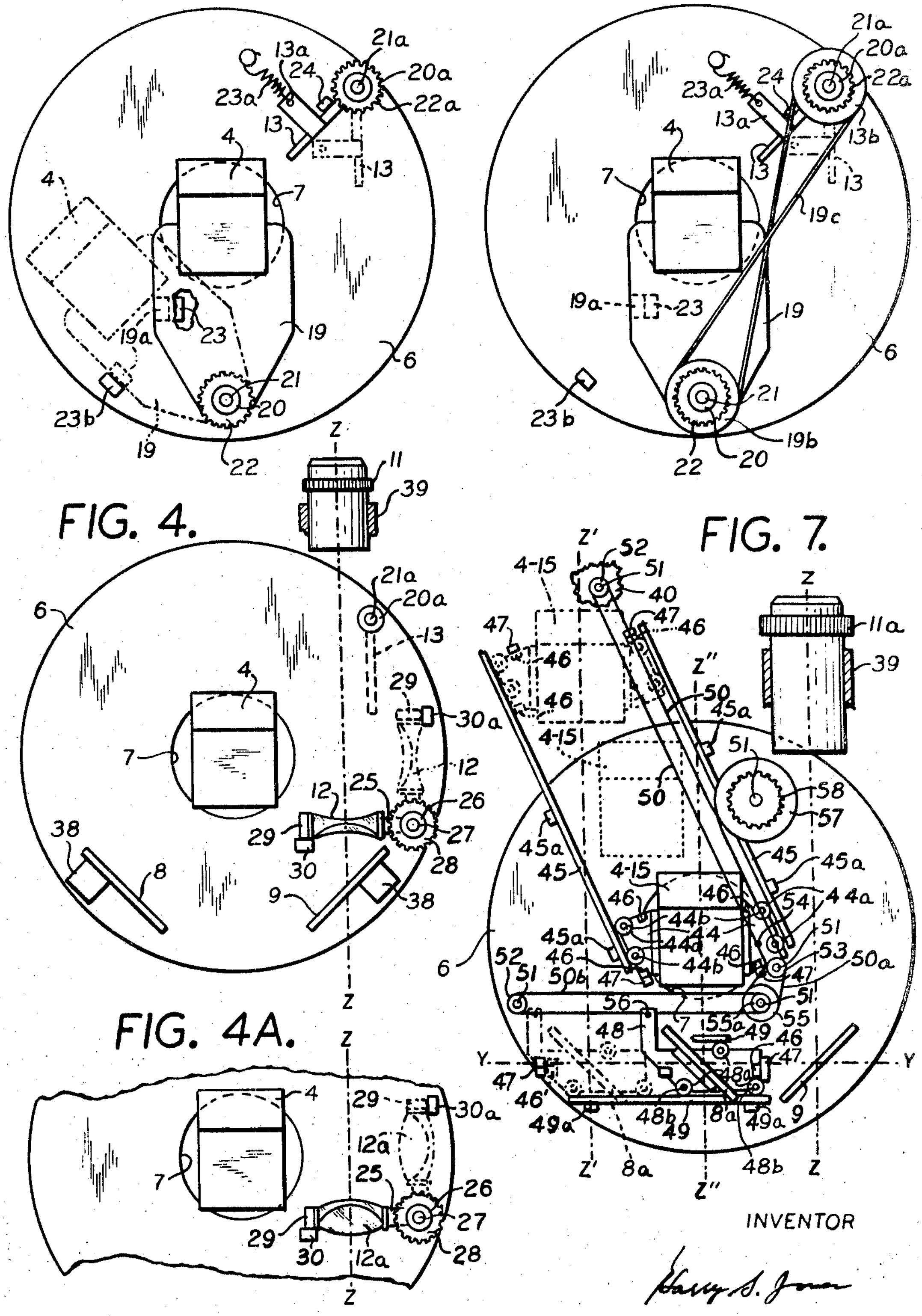
FIGURE 3 is a fragmentary view showing means of support and control of optical switching components as viewed along the main optical axis looking toward the distant object viewed.
FIGURE 3A is a fragmentary view showing means of support and control of optical switching components as viewed along the main optical axis looking toward the distant object viewed.
FIGURE 4 is a fragmentary view showing means of support and control of an auxiliary lens and other components as viewed along the main optical axis looking toward the distant object viewed.
FIGURE 4A is a fragmentary view showing means of support and control of an auxiliary lens and other components as viewed along the main optical axis looking toward the distant object viewed.
FIGURE 7 is a fragmentary view showing means of support and control of optical components used in a modified optical switching system as viewed along the main optical axis looking toward the distant object viewed.

Referring to FIGURE 3, penta prism 4 may be held by a support member 19 fastened to a hub 20 fitted around a shaft 21 fastened to support base 6. By means of a knob 22 fastened to hub 20, or any other suitable means, penta prism 4 may be moved as desired by the observer to a storage position clear of aperture 7 in base 6, as shown by the dotted lines, from its position over aperture 7 shown by solid lines. The position of penta prism 4 over aperture 7 is accurately determined and maintained by a stud 23 constructed of a magnetically-permeable material fastened to base 6 and positioned so that it stops member 19 in the proper position to center the aperture of penta prism 4 about axis X—X by contacting a permanent magnet 19*a* attached to support 19. Mirror 13 may be held by a support 13*a* fastened to a hub 20*a* fitted around a shaft 21*a* fastened to support base 6. A tension spring 23*a* holds mirror support 13*a* against a stud 24 fastened to base 6. Stud 24 is positioned so that the plane of mirror 13 is maintained accurately at an angle of 45° to axes Y'—Y' and Z—Z. By means of a knob 22*a* fastened to hub 20*a*, or by any other suitable means, mirror 13 may be moved from its storage position (dotted lines, knob 22*a* turned left) to its functioning 45° position (solid lines, knob 22*a* turned right).

When desired, the control of mirror 13 may be linked or "ganged" to penta prism 4 by an suitable means. For example, pulleys 19*b* and 13*b* fastened to support 19 and support 13*a*, respectively, may be cross-connected by a belt 19*c* as shown in FIGURE 3A. Penta prism 4 then will be accurately held in its functioning position by the attraction between magnet 19*a* and stud 23 when knob 22 is turned to the right. This magnetic attraction will also maintain mirror 13 in its storage or non-functioning position, shown by dotted lines, against the tension of spring 23*a*. When knob 22 is turned to the left, or knob 22*a* is turned to the right penta prism 4 will be moved clear of aperture 7 into its storage position, as shown by dotted lines, and mirror 13 will be moved to its functioning 45° position shown by solid lines. A second stud 23*b* of magnetically-permeable material may be fastened to base 6 in order to hold support 19 for penta prism 4 firmly in a storage position, if desired. In order to limit magnetic breakaway forces and impact noise when optical switching occurs a layer of any suitable semielastic, non-magnetic material such as plastic, felt, paper or metal wool may be attached to any or all of the contact faces of parts 13, 13*a*, 19*a*, 23, 23*b*, or 24. To compensate for manufacturing tolerances the positions of any or all parts 13, 13*a*, 19*a*, 23, 23*b* or 24 may be made adjustable relative to base 6 by any usual means. By variation of the thickness of the above-indicated layer of semi-elastic material the magnetiude of magnetic breakaway force may be limited to any desired value. It will be celar that if parts 13*a* and 24 are made of magnetic materials in order to attract each to the other the mechanical spring 23*a* may be omitted, if desired. It will also be clear that permanent magnets and magnetically-permeable materials may be positionally interchanged in the above-described magnetic-mechanical systems with negligible difference in the results obtainable.

Figure 6:
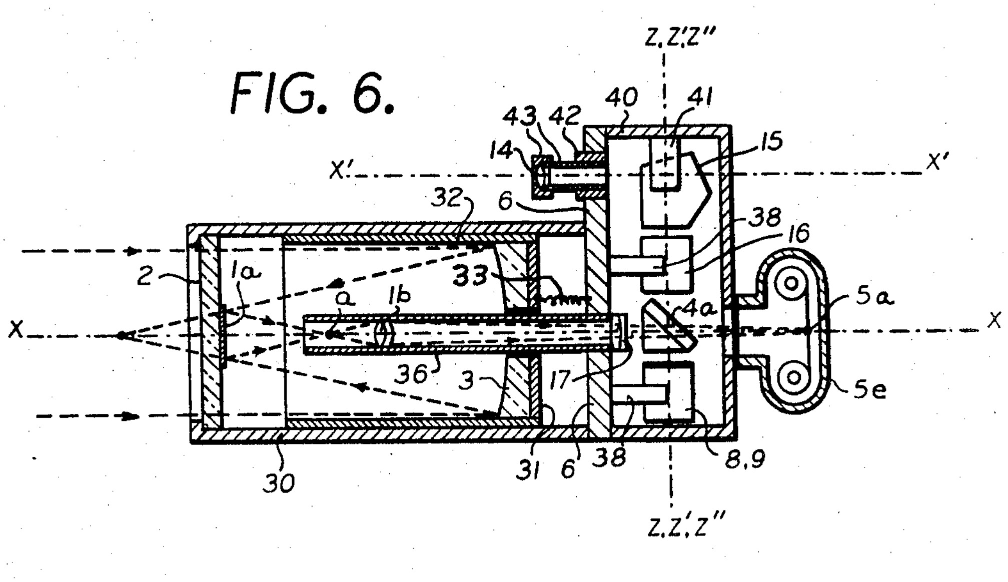
FIGURE 6 is a fragmentary longitudinal sectional view showing some components as viewed perpendicular to the main optical axis of a main objective system having an erect image.

When the main optical system produces an erect image, as does the optical system shown in FIGURE 6 due to the addition of erector lens 1*b* which uses the compact optical system described in my copending patent application, Ser. No. 358,561, an Amici or "roof" prism 4*a*, as shown in FIGURE 6, may be substituted directly for penta prism 4 in the systems shown in FIGURES 1, 3, 4, 5 and 7. Since this substitution merely requires the Amici prism to be placed so that it produces the same 90° optical path deviation from axis X—X to axis Z''—Z'' as produced by penta prism 4 a separate figure similar to FIGURE 3 showing Amici prism 4*a* substituted for penta prism 4 is not necessary for the purpose of specification. However, since the optical path length through Amici prism 4*a* will be shorter than through penta prism 4 the focal lengths of lenses 17 and 18 will be different than the values required when penta prism 4 is used.

With or without the use of achromatic lenses 17 or 18 for visual focus and camera focus equalization an achromat 12 may be inserted between mirror 9 and eyepiece

11, as shown in FIGURE 4 and 4A, in order to vary the image magnification at paint 5*c* if desired. Lens 12 may be a negative achromat as shown in FIGURE 4 when it is desired to increase the magnification and to decrease the field of view or a positive achromat 12*a* as shown in FIGURE 4A when the reverse is desired. When either type of achromat is utilized it will be necessary to refocus the main optical system by movement of mirror 3 or its equivalent. Lens 12 may be held by a support member 25 fastened to a hub 26 fitted around a shaft 27 fastened to support base 6. When a knob 28 fastened to hub 26 is turned to the left lense 12 may be moved from its non-functioning or storage position shown by dotted lines to its functioning position along axis Z—Z as shown by solid lines. Lens 12 may be held precisely and firmly in position relative to axis Z—Z by contact between a permanent magnet 29 fastened to support 25 and a stud 30 constructed of magnetically-permeable material fastened to base 6. A similar stud 30*a* fastened to base 6 insures that lens 12 remains firmly in its storage position when knob 28 is turned to the right. The contact faces of parts 29, 30 or 30*a* may be covered by a thin layer of non-magnetic, semi-elastic material in order to limit the magnetic breakaway force and impact noise when knob 28 is operated, as previously described for similar use.

FIGURE 5 illustrates various mechanical components of the type needed to support and to permit operation of certain optical components not previously described. Secondary mirror 1 is fastened concentrically to window 2 which is held concentrically within a tube 30 which is fastened to base plate 6. Mirror 3 is fastened to a support 31 attached to one end of a tube 32 which fits closely but freely within tube 30. A tension spring 33 attached to support 31 and base 6 or housing 40 holds parts 3, 31 and 32 firmly against a focus-adjusting screw 34 threaded through base 6 and/or housing 40. A tubular light shield 36 is fastened to base 6 and is concentric with optical axis X—X of the above-indicated co-axial optical components. Light shield 36 also passes through hole 7*a* in mirror 3 in order to allow mirror 3 to move freely along axis X—X for the purpose of main system focal adjustment. Such focal adjustment is aided by a knob 35 attached to screw 34. Optical components 4, 8, and 9 are also shown in their relative functioning positions. The means of support and control for penta prism 4 are shown in FIGURES 3 and 3A and one means of support and control for lens 18 is shown in FIGURE 2A. Since lens 18 will normally be used only when pent prism 4 is used this lens may also be fastened close to either transmission face of pent prism 4 (or Amici prism 4*a* when used in lieu of penta prism 4) by means of a suitable support member 37, if desired. The alternate positions of lens 18 and support member 37 are shown by solid and dotted lines for use along axes X—X and Z''—Z'' respectively. Stationary mirrors 8, and 9 are attached to support base 6 by means of support members 38. Eyepiece 11 is held and adjusted by a smooth friction fit within an extension collar 39 attached to housing 40 or attached to base 6. Eyepiece 11 may therefore be adjusted axially along axis Z—Z by the means described above or by any more sophisticated usual means (not shown) such as by rotation against threads around eyepiece 11 and collar 39. Such axial adjustment of eyepiece 11 may be used to focus either the main system or the finder system when desired.

FIGURE 6 illustrates various mechanical components of the type needed to support and to permit operation of certain optical components not previously fully described. In addition, it shows an erect-imaging main optical system which, when an Amici prism 4*a* is substituted for penta prism 4, also provides an erect image at eyepiece 11. This erect-imaging system is one of those shown in my copending patent application Ser. No. 358,561 and has, as its principal novel feature, a secondary mirror 1*a* which is a reflective spot located at the center of window 2 which is held concentrically within a tube 30 which is fastened to base plate 6. The means for focusing this system by means of axial movement of mirror 3 are the same as described above in connection with FIGURE 5. However, a positive achromatic lens **1*b* is mounted within tubular light shield 36 for the purpose of transferring the real image of a distant object focused by mirror 3** at point *a* to point **5*a* within a camera housing 5*e*, as in the systems previously described. As lens 1*b* erects the image, Amici prism 4*a* is needed in lieu of penta prism 4 in order to obtain an erect image at the eyepiece focal plane position 5*c* shown in FIGURE 1. Penta prism 15 is held by a support member 41 which may be attached either to base plate 6 or to housing 40. Finder objective lens 14 is mounted in a tube 43 held and adjusted by a smooth friction fit within an extension collar 42 attached to housing 40 or attached to base 6. Objective lens 14 in its tube 43 may therefore be adjusted axially along axis X′—X′ by the means described above or by any more sophisticated usual means (not shown) such as by rotation against threads around tube 43 and collar 42**.

FIGURE 7 shows an alternate optical switching means in which one moveable penta prism designated for convenience as 4–15 serves in the positions occupied by penta prisms 4 and 15 in the previously-described switching systems. This alternate system also provides a longer optical path between finder objective 14 and the eyepiece **11*a* may be of the variable focal length type, if desired. This longer optical path offers the advantage of higher finder system magnification when desired. In this system a moveable flat mirror 8*a* is shuttled along axis Y—Y between axes Z′—Z′ and Z″—Z″ and penta prism 4–15 is shuttled between axes X—X and X′—X′. Axis Y′—Y′ and mirrors 13 and 16 are not used in this system. When desired, a single control may be used to "gang" the displacement of optical switching components 8*a* and 4–15 so that penta prism 4–15 is in its finder operating position (dotted lines) when mirror 8*a* is in the finder position shown by dotted lines and so that penta prism 4–15 is in its main system operating position (solid lines) when mirror 8*a* is in the position shown by solid lines. Mirror 9 remains in the same fixed position as in the previously described systems. When desired, lens 17 or 18 may be used, as previously described, and must be moved between penta prism 4–15 and base plate 6 to avoid interference with penta prism 4–15 and its positioning mechanism. In this system a lug 44 is fastened to each side of penta prism 4–15. Two rollers 44*a* are attached to each lug 44 by means of shafts 44*b* in order to minimize friction when belt 50 moves prism 4–15 between axes X—X and X′—X′. By means of retaining rails 45 attached to base 6 by supports 45*a* lugs 44 are confined to a linear movement parallel with the surface of base 6 and perpendicular to optical axes X—X and X′—X′. To insure precise and firm positioning at each extreme of travel magnets 46 attached to lugs 44 are attracted to bumpers 47 constructed of magnetically-permeable material fastened to base 6 or the extension of base 6 at the finder system. Similarly, a lug 48 is attached to mirror 8*a*. By means of retaining rails 49 attached to base 6 by supports 49*a* lug 48 is confined to a linear movement parallel with the surface of base 6 and perpendicular to optical axis X—X. To insure precise and firm positioning at each extreme of travel magnets 46 attached to lug 48 are attracted to bumpers 47 constructed of magnetically-permeable material fastened to base 6. The motions of mirror 8*a* and penta prism 4–15 are linked or "ganged" by means of three belts or cables. One belt 50 links a pulley 52 mounted on a shaft 51 fastened to the extension of base 6 at the finder system or to housing 40 with a two-belt pulley 53 mounted on a shaft 51 fastened to base 6. Belt 50 is also connected to one lug 44 attached to penta prism 4–15 at a point 54. Belt 50 is also passed around a larger pulley 57 mounted on a shaft 51 attached to base 6. Pulley 53 is linked by a second belt 50*a* to a larger pulley 55 mounted on a shaft 51 fastened to base 6. A smaller diameter section 55*a* of pulley 55 fastened to pulley 55 is linked by a third belt 50*b* to a pulley 52 mounted on a shaft 51 fastened to base 6. Belt 50*b* is also attached to lug 48 at a point 56. Three rollers 48*a* are attached to lug 48 by means of shafts 48*b* attached to lug 48 in order to minimize friction when belt 50*b* moves mirror 8*a* along axis Y—Y between axes Z′—Z′ and Z″—Z″. By means of a knob 58 attached to pulley 57 mirror 8*a* and penta prism 4–15 may be positioned simultaneously for finder operation (dotted lines) by a counter-clockwise turn, or for main system operation (solid lines) by a clockwise turn. If desired, a fixed penta prism 15 may be located permanently in the finder position of penta prism 4–15, as in the system previously described. Penta prism 4–15 or a second penta prism 4 may then be mounted and moved substantially as just described and shown in FIGURE 7 but arranged to move only to the intermediate dotted position for storage, as shown between the Z′—Z′ and Z″—Z″ axis positions, in order not to shadow the optical path of the finder system. An Amici prism 4*a* may also be substituted directly for penta prism 4 or penta prism 4–15**, as in the system just described, if the main system objective produces an erect image.

If it is not desired to "gang" the switching components as described above each component may be moved independently by separate knobs similar to knob 58 which are independently coupled to switching components **8*a* and to to penta prism 4–15 or 4**.

In all the systems described above all right angles between optical axes do not necessarily have to be precisely 90° since variations of a few degrees are relatively unimportant to the observer, provided that the optical paths are not obstructed. If desired for the comfort of the observer, the angle between the axis of the common eyepiece and axes X—X and X′—X′ may be made less than 90°. To accommodate this change mirrors 8, **8*a* and 9 may be appropirately rotated and mirrors 13 and 16 appropriately rotated and also displaced toward the observer, with or without an appropriate displacement of penta prism 15**. Such a variation in eyepiece and mirror positions would provide erect images at more comfortable eyepiece angles when terrestrial objects are viewed.

Anent a more complete description of the above modification, consider plane mirrors 13 and 16 or mirrors 8 and 9 as replaced by an assembly that maintains either pair in a mutually perpendicular relationship, as in the case of a Poro prism, when these mirror pairs are in their functioning positions. If the angle between the eyepiece axis and axes X—X and X′—X′ is made less than 90° by tilting eyepiece 11 either toward the object being viewed or toward the observer's face in a plane approximately parallel with axes X—X and X′—X′ and the mirror 8 and mirror 9 pair is rotated by one-half the angle of eyepiece tilt from the 90° position the observer will continue to see an erect image via eyepiece 11. The axis Z—Z of eyepiece 11 and the mirror pair consisting of mirrors 8 and 9 are tilted about axis Y—Y. However, if the auxiliary optical system is to be included when eyepiece 11 is tilted the mirror pair consisting of mirrors 13 and 16 must be similarly tilted and also displaced in the same direction that eyepiece 11 is moved. To compensate for this displacement penta prism 15 and lens 14 must also be displaced in the same direction as eyepiece 11 is moved. When penta prism 4 is replaced by Amici prism **4*a***, when needed, identical results will be obtained.

In systems which do not utilize a camera housing **5*e* with film at plane 5 both penta prisms 4 and 15 may be fixed in position and finder to main system switching may be accomplished by translation of mirror 8*a* only, as described above in connection with FIGURE 7, or optical switching may be accomplished by rotation of mirror 13** only, as described above in connection with FIGURE 3 for the first system as shown in FIGURE 1.

It will be clear that all systems described above may also be arranged in reverse-handed (left handed) form relative to that illustrated and described. For example, the respective left and right positions of penta prism 15 and eyepiece 11 may be interchanged with appropriate changes in the positions of other associated parts.

In this invention both eyepiece 11 (of fixed focal length) and eyepiece 11*a* (of variable focal length) are of the erect type. These eyepieces simply utilize the erect image available at the eyepiece field plane at point 5*c* and provide the observer with a magnified erect image. Either type of eyepiece may be used in the various systems described above.

All control knobs 22, 22*a*, 28, 35 and 58, are located outside housing 40, the shafts upon which they are mounted being passed through holes in housing 40 when any or all of these knobs are used.

The mechanical structures used for support and adjustment of the optical components in this invention are for the purpose of illustrative convenience and variations in these structures may be made without changing the basic optical switching systems described herein or the various switching combinations and features of this invention.

The various systems and components described above make possible various highly useful features and function combinations which may be used in combination visual and photographic type telescopes, particularly those used for terrestrial observations and telephotography. Some of these features and functions are the following, in combination with erect eyepiece images for both finder and main optical systems:

(a) Referring to FIGURE 1, with penta prism 4 removed from its position in front of hole 7, a camera housing 5e can be used with its film at plane 5 for photographic purposes. With mirror 13 in its functioning position (shown by the solid lines) the finder system including objective 14, penta prism 15, mirror 16, mirror 13 and eyepiece 11 may simultaneously be used. When main system viewing via eyepiece 11 is desired, mirror 13 may be moved into its storage or non-functioning position (shown by dotted lines) simultaneously with movement of penta prism 4 to its functioning position in front of hole 7 by mechanically "ganging" or linking mirror 13 and penta prism 4 together so that they may be operated by a single control element 22, as shown in FIGURE 3A, or by any other suitable linkage means. Clearly, these switching components may also be moved independently, if desired. When mirror 13 is in its non-functioning position (shown by dotted lines) eyepiece 11 may be used to observe via the main optical system using objective components 1, and 3, penta prism 4 and mirrors 8 and 9. With a fixed eyepiece focus the main and auxiliary systems may be independently focused by axial adjustment of their respective objective components 3 and 14, by such means as shown in FIGURES 5 and 6. When desired, the focus of either system may also be adjusted by axial movement of eyepiece 11 as shown in FIGURE 5.

(b) When desired, the negative or positive achromat 12 or 12*a* shown in FIGURES 4 or 4A may be inserted along axis Z—Z to obtain a greater or lesser magnification of the main system image at point 5*c*. This will, of course, require refocusing of the main optical system by axial movement of objective mirror 3.

(c) Use of a variable focal length ("Zoom" type) eyepiece 11*a* having its field plane at or close to point 5*c* in lieu of a fixed focal length eyepiece 11 will also permit the magnification of both systems to be varied independently by this eyepiece.

(d) When desired, the positive achromat 17 shown in FIGURE 2 may be inserted in the main optical system along axis X—X close to hole 7 when photographic film is used at plane 5 so that both the eyepiece image focus at point 5*c* and the camera film focus at point 5*a* will be sharp when the focus at either point has been pre-adjusted by axial adjustment of mirror 3. To accomplish sharp focus at points 5*a* and 5*c* the eyepiece 11 may be used for final precision adjustment of the visual focus after the camera film focus at plane 5 has been set by axial movement of mirror 3 and checked by any usual means. By virtue of this feature an adjustment of the main system focus by axial movement of mirror 3 by the observer against a focal plane reticle or crosshairs located in eyepiece 11 in the position of image point 5*c* with achromat 17 in its storage position will then automatically result in precision focus upon the camera film at plane 5 when achromat 17 is returned to its operating position without resort to ground-glass screens or to such other similar focusing means as may be provided in the camera. The advantage of this feature will be clear when dark objects or when briefly-available objects are being photographed. Sharp auxiliary system focus may be accomplished independently from the carefully-adjusted main system without disturbance of the carefully-adjusted eyepiece 11 by axial adjustment of the position of auxiliary objective 14 by means such as shown in FIGURE 6 and previously described. Use of achromat 17 will reduce the photographic *f*/number and magnification and increase the photographic field angular diameter.

(e) When desired, the negative achromat 18 shown in FIGURES 2A and 5 may be inserted in the main optical system close to penta prism 4 along axis X—X or axis Z″—Z″ so that both the eyepiece image focus at point 5*c* and the camera film focus at point 5*a* will be sharp when either focus has been pre-adjusted. To accomplish sharp focus at points 5*a* and 5*c* the eyepiece 11 may be used for final precision adjustment of the visual focus after the camera film focus at plane 5 has been set by axial movement of mirror 3 and has been checked by any usual means. With this feature adjustment of the main system focus by axial movement of mirror 3 by the observer against a focal plane reticle or crosshairs located in eyepiece 11 in the position of image point 5*c* will then automatically result in precision focus upon the camera film at plane 5 without resort to ground-glass screens or to such other similar focusing means as may be provided in the camera. The advantage of this feature will be clear when dark objects or when briefly-available objects are being photographed. Sharp auxiliary system focus may be accomplished independently from the carefully-adjusted main system without disturbance of the carefully-adjusted common eyepiece 11 by axial adjustment of the position of auxiliary objective 14 by means such as shown in FIGURE 6 and previously described. Since achromat 18 is not normally used for photographic purposes the photographic *f*/number and field size will not be altered. However, the introduction of the negative achromat into the main system will increase the main system visual magnification and *f*/number and reduce the visual field angular diameter.

(f) When the main optical system produces an erect image, as does the system shown in FIGURE 6, an Amici or "roof" prism 4*a* may be directly substituted for penta prism 4 in order to obtain an erect main system image at eyepiece 11. When this substitution of prism 4*a* for prism 4 is made any of the features and functions described above may be obtained.

(g) When the alternate switching system shown in FIGURE 7 is used either with a penta prism or with an Amici prism any of the features and functions described above may be obtained.

(h) When desired to obtain higher magnification for photographic purposes with a higher *f*/number the negative achromat 18 may be used without penta prism 4 or prism 4*a* and with the camera film located at point 5*a* or at a more distant point 5*d*. This will, of course, require refocusing by movement of mirror 3.

(i) It should be noted that since the positive achromat 17 is normally used only for photographic purposes and is removed when penta prism 4 is in its functioning position, negative achromat 12 may also be used to increase the main system visual magnification at point 5*c* when desired. A negative achromat 12 will not normally be used when negative achromat 18 is used, or vice-versa.

(j) Use of magnetic forces makes possible firm and precise location of the optical components that are switched when these components are in their operating or their storage positions.

Preferred forms of this invention have been illustrated and described, but changes and modifications can be made, and some features can be used in different combinations without departing from the invention as defined in the claims.

What is claimed is:

1. A telescope comprising a main objective assembly having a primary optical axis, a finder objective assembly having a secondary optical axis and a single eye-piece operatively associated with both said finder and said main objective and including a first reflector means disposed between said main objective and said eyepiece, a second reflective means located on said secondary optical axis disposed between said finder objective and said eyepiece and a third reflective means pivotally mounted and optically aligned between said eyepiece and both said first and said second reflective means interceding in the light path between said eyepiece and only one of said first and said second reflective means at a time wherein each of said objectives is separately and independently focusable, both with respect to each other and with respect to the eyepiece, and wherein a plate having an axial aperture therein is interposed between said first reflective means and said main objective.

2. A telescope as claimed in claim 1, including lens means operatively associated with said plate, adapted to be disposed within said aperture and to be disposed out of said aperture.

3. A telescope as claimed in claim 2, including camera means operatively associated with said main objective assembly and adapted to be operative with said lens means disposed within said aperture.

4. A telescope as claimed in claim 1, including magnetic holding means operatively associated with the moving parts of said reflective systems, adapted to hold said reflective systems in a predetermined position.

5. A telescope as claimed in claim 1, including means operatively associated with said finder objective assembly, adapted to fix the focus thereof at a predetermined value.

6. A telescope as in claim 1, wherein said first and second reflective means comprise a single reflective means movable between at least two positions.

7. A telescope as claimed in claim 1, wherein said first and third reflective means are collectively movable by a single means into and out of operative association with said eyepiece whereby when said eyepiece is operatively associated with said main objectives, said first reflective means is disposed therebetween, and when said eyepiece is operatively associated with said finder objective, said third reflective means is therebetween.

8. A telescope as claimed in claim 6, wherein said single reflective means and said third reflective means are simultaneously movable by a single means such that when said single reflective means is in the first reflective means position, said third reflective means is inoperative, and when said single reflective means is in the second reflective means position, said third reflective means is optically between said eyepiece and said finder objective.

References Cited

UNITED STATES PATENTS

| | | | |
|---|---|---|---|
| 835,625 | 11/1906 | Konig | 350—34 |
| 2,481,082 | 9/1949 | Chew. | |
| 2,670,656 | 3/1954 | Braymer | 350—199 |
| 2,753,760 | 7/1956 | Braymer | 350—28 X |
| 3,049,054 | 8/1962 | Waland | 350—199 X |
| 3,152,214 | 10/1964 | Korones et al. | 350—28 |
| 3,173,984 | 3/1965 | Vogl. | |

DAVID SCHONBERG, Primary Examiner

P. R. GILLIAM, Assistant Examiner

U.S. Cl. X.R.

350—34, 199

PO-1050
(5/69)

UNITED STATES PATENT OFFICE

CERTIFICATE OF CORRECTION

Patent No. 3,468,597 Dated Sept. 23, 1969

Inventor(s) HARRY S. JONES

It is certified that error appears in the above-identified patent and that said Letters Patent are hereby corrected as shown below:

Column 11, line 18, "reflector" should be --reflective--

SIGNED AND
SEALED
APR 28 1970

(SEAL)
Attest:

Edward M. Fletcher, Jr.
Attesting Officer

WILLIAM E. SCHUYLER, J
Commissioner of Patent